(12) United States Patent
Dobrovolskiy et al.

(10) Patent No.: US 7,757,034 B1
(45) Date of Patent: Jul. 13, 2010

(54) EXPANSION OF VIRTUALIZED PHYSICAL MEMORY OF VIRTUAL MACHINE

(75) Inventors: Nikolay N. Dobrovolskiy, Moscow (RU); Andrey A. Omelyanchuk, Moscow (RU); Alexey B. Koryakin, Moscow (RU); Anna L. Vorobyova, Moscow (RU); Alexander G. Tormasov, Moscow (RU); Serguei M. Beloussov, Singapore (SG)

(73) Assignee: Parallels Software International, Inc., Tortola (VG)

( * ) Notice: Subject to any disclaimer, the term of this patent is extended or adjusted under 35 U.S.C. 154(b) by 840 days.

(21) Appl. No.: 11/558,498

(22) Filed: Nov. 10, 2006

Related U.S. Application Data

(60) Provisional application No. 60/806,221, filed on Jun. 29, 2006.

(51) Int. Cl.
*G06F 12/00* (2006.01)
(52) U.S. Cl. .......................................... 711/6; 711/209
(58) Field of Classification Search ................... 711/6, 711/209
See application file for complete search history.

(56) References Cited

U.S. PATENT DOCUMENTS 7,299,337 B2 * 11/2007 Traut et al. .................. 711/206
2005/0183077 A1 * 8/2005 Langdale et al. ............. 717/148
2006/0224815 A1 * 10/2006 Yamada et al. ................. 711/6

OTHER PUBLICATIONS

Kath, Randy, Managing Memory-Mapped Files in Win32, Feb. 9, 1993, [online] [URL: http://msdn.microsoft.com/en-us/library/ms810613(printer).aspx] [retreived from internet Dec. 17, 2009], pp. 1-14.*

Barham et al., Xen and the Art of Virtualization, Oct. 2003, ACM [online] [URL: http://delivery.acm.org/10.1145/950000/945462/p164-barham.pdf?key1=945462&key2=2391701621&coll=GUIDE&dl=GUIDE&CFID=67144388&CFTOKEN=62041684] [retreived from internet Dec. 17, 2009], pp. 164-177.*

Whitaker et al., Scale and Performance in the Denali Isolation Kernel, Winter 2002, OSDI '02: Proceedings of the 5th symposium on Operating systems design ane implementation, ACM, pp. 195-209.*

* cited by examiner

*Primary Examiner*—Christian P Chace
*Assistant Examiner*—Jared I Rutz
(74) *Attorney, Agent, or Firm*—Bardmesser Law Group (57) ABSTRACT

A system, method and computer program product for virtualizing a processor and its memory, including a host operating system (OS); and virtualization software that maintains a virtualization environment for running a Virtual Machine (VM) without system level privileges and having a guest operating system running within the Virtual Machine. A plurality of processes are running within the host OS, each process having its own virtual memory, wherein the virtualization software is one of the processes. An image file is stored in persistent storage and maintained by the host operating system. The image file represents virtualized physical memory of the VM. A plurality of memory pages are aggregated into blocks, the blocks being stored in the image file and addressable in block form. The virtualization software manages the blocks so that blocks can be mapped to the virtualization software process virtual memory and released when the blocks are no longer necessary. The host OS swaps the blocks between the image file and physical memory when a block that is not in physical memory is accessed by the VM. The image file size is not subject to limitation on virtual process memory size. A user of the VM can access a larger virtual process memory than the host OS permits.

25 Claims, 6 Drawing Sheets

EXPANSION OF VIRTUALIZED PHYSICAL MEMORY OF VIRTUAL MACHINE

CROSS-REFERENCE TO RELATED APPLICATIONS

This application is a non-provisional of U.S. Provisional Patent Application No. 60/806,221, filed on Jun. 29, 2006, entitled EXPANSION OF VIRTUAL PROCESS MEMORY, which is incorporated by reference herein in its entirety.

BACKGROUND OF THE INVENTION

1. Field of the Invention

The present invention relates to Virtual Machine technology, and, more particularly, to memory management for Virtual Machines.

2. Background Art

With Virtual Machine (VM) technology, a user can create and run multiple operating environments on a server at the same time. Each operating environment, or Virtual Machine, requires its own operating system (OS) and can run applications independently. The VM software provides a layer between the computing, storage, and networking hardware and the software that runs on it.

Virtual Machine technology can lower information technology (IT) cost through increased efficiency, flexibility, and responsiveness. Each VM acts as a separate environment, which reduces risk and allows developers to quickly re-create different operating system (OS) configurations or compare versions of applications designed for different OS's. Additional customer uses for VMs include targeted production server consolidation, hosting of legacy applications (older versions), and computer or server backup.

A Virtual Machine technology is therefore one technique for emulating or otherwise virtualizing the behavior of software and/or hardware. Generally, a Virtual Machine is an environment that is launched on a particular processor that is running an operating system. Normally, the operating system installed on such a machine or processor has certain privileges that are not available to user applications. For example, many input/output commands may be privileged, and executable only in the operating system (or privileged) mode. Certain areas of memory, or certain addresses in memory, also may require operating system privilege to be accessed.

For each VM, a separate process is created, and the host operating system (HOS) is responsible for scheduling of both the VMs and other processes in the HOS. Examples of such hosted VMMs include VMware GSX Server, VMware Workstation, MS Virtual PC, MS Virtual Server and SVISTA 2004.

Many of the applications where Virtual Machines are used can be separated into desktop applications and server applications. The implications for the Virtual Machines, and the resource management of such Virtual Machines, are therefore different. For example, one of the limitations of Microsoft Windows (the 32-bit version) today is that a process is allocated a finite amount of virtual memory by the HOS, usually less than 2 GB (because 2 GB is default limit for the user space in Windows). For many desktop applications, where Virtual Machines are used to run legacy software applications, or where only one or two Virtual Machines are launched, this is frequently sufficient.

On the other hand, server-based applications often require more memory. For example, with each Virtual Machine supporting its own virtual server, it is desirable to "give" to that Virtual Machine a larger address space and a larger amount of process virtual memory—for example, 100 GB. Few desktop processes require this much memory (at least today, in 2006), whereas it is not unusual to have server applications that can benefit from a larger address space and a larger memory allocation. Memory sharing (but not disk data sharing) is also described in U.S. Pat. No. 6,789,156.

Accordingly, there is a need in the art to be able to allocate more memory to a Virtual Machine than the operating system nominally supports.

BRIEF SUMMARY OF THE INVENTION

The present invention is directed to a system and method for expansion of process virtualized physical memory of a Virtual Machine that substantially obviates one or more of the problems and disadvantages of the related art.

There is provided a system, method and computer program product for virtualizing a processor and its memory, including a system, method and computer program product for virtualizing a processor and its memory, including a host operating system (OS); and virtualization software that maintains a virtualization environment for running a Virtual Machine (VM) without system level privileges and having a guest operating system running within the Virtual Machine. A plurality of processes are running within the host OS, each process having its own virtual memory, wherein the virtualization software is one of the processes. An image file is stored in persistent storage and maintained by the host operating system. The image file represents virtualized physical memory of the VM. A plurality of memory pages are aggregated into blocks, the blocks being stored in the image file and addressable in block form. The virtualization software manages the blocks so that blocks can be mapped to the virtualization software process virtual memory and released when the blocks are no longer necessary. The host OS swaps the blocks between the image file and physical memory when a block that is not in physical memory is accessed by the VM. The image file size is not subject to limitation on virtual process memory size. A user of the VM can access a larger VM physical memory than the host OS permits.

As further options, a counter is associated with each block, such that when the block is used in a predetermined period of time, the counter is incremented by one, when the block is not used in the predetermined period of time, the counter is decremented, and when the counter becomes zero, the block is designated as a free block. The free block remains as a mapped element, but the free block not used by the Virtual Machine. When the Virtual Machine attempts to access a block that is not in the process virtual memory, a new block is allocated from free virtual process memory region, and is pushed to the hash table. If all of the physical memory allocated to the Virtual Machine has been used up, then the free block is swapped out to the image file. The block that Virtual Machine is trying to access is brought into the physical memory.

As further options, the block includes multiple memory pages. Different blocks can share pages. The blocks can be of different size. A direct access hash table can be used for addressing blocks. The direct access hash table includes a plurality of hash keys, with each hash key based on a portion of a guest physical address of its corresponding block. Overlapping blocks can have the same hash key to get or check corresponding block presence and to access current VM physical memory faster.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the embodiments of the present invention, examples of which are illustrated in the accompanying drawings.

For purposes of the present discussion, it is assumed that the reader is familiar with Virtual Machines in general and virtualization of operating system and computer resources in particular. Examples of Virtual Machines are commercially available, for example, from Parallels Software International, Inc., the assignee of this application, from VMWare, Inc., and from Microsoft Corporation.

In considering the question of memory allocation and memory management, a hierarchy is worth keeping in mind. A computer has physical memory, which today for most computers used as desktops and servers is usually somewhere between 256 MB and 1 GB. Obviously, any instructions executing on a processor need to be in physical memory, and any data that the instructions operate on also needs to be in physical memory. The next level up in the hierarchy is the virtual memory allocated to a process. As noted earlier, typically, this is approximately 2 GB or less for MS Windows. The host operating system (HOS), or the Primary Operating System, is usually responsible for ensuring that when a process attempts to address a location in memory that is not in actual physical memory, this attempt is intercepted and somehow handled.

In practice, using the Intel processor architecture as an example, memory is divided into pages, each page being 4 KB in size. One of the attributes of the page maintained by the operating system is the Present/Not Present bit, with 0 being present, and 1 being not present. If a process with 2 GB of virtual memory, but only (for example) 50 MB of physical memory attempts to access a page that is not in physical memory, a page fault is triggered (since the present bit for that page is 0). The host operating system then "gets" the page from somewhere (usually from a disk) and places it in physical memory, while some other page that the host operating select for replacement of will be swapped back to the disk, based on some algorithm that the host operating system uses for swapping pages.

The next higher level in the memory management hierarchy is, in this discussion, a much larger address space than the 2 GB of virtual memory allocated to the process by the host operating system. On this hierarchy level, the virtualization software allows the Virtual Machine to have a much larger address space, for example, 100 GB, for purposes of this discussion, although, strictly speaking, the number is not limited to even these numbers, but is essentially limited by the width of the address bus (e.g., 36 bits, or $2^{36}$ addresses=64 Gigabytes, 56 bits, or $2^{56}$ addresses, etc.). Thus, as far as the Virtual Machine is concerned, it has an address space of 100 GB in this example.

In the discussion below, a page is used as a basic aggregate unit of memory, although the term is not meant to be limited to pages in the Intel architecture context, and may be simply thought of as a basic fragment of memory used by the OS to manage memory.

Figure 1:
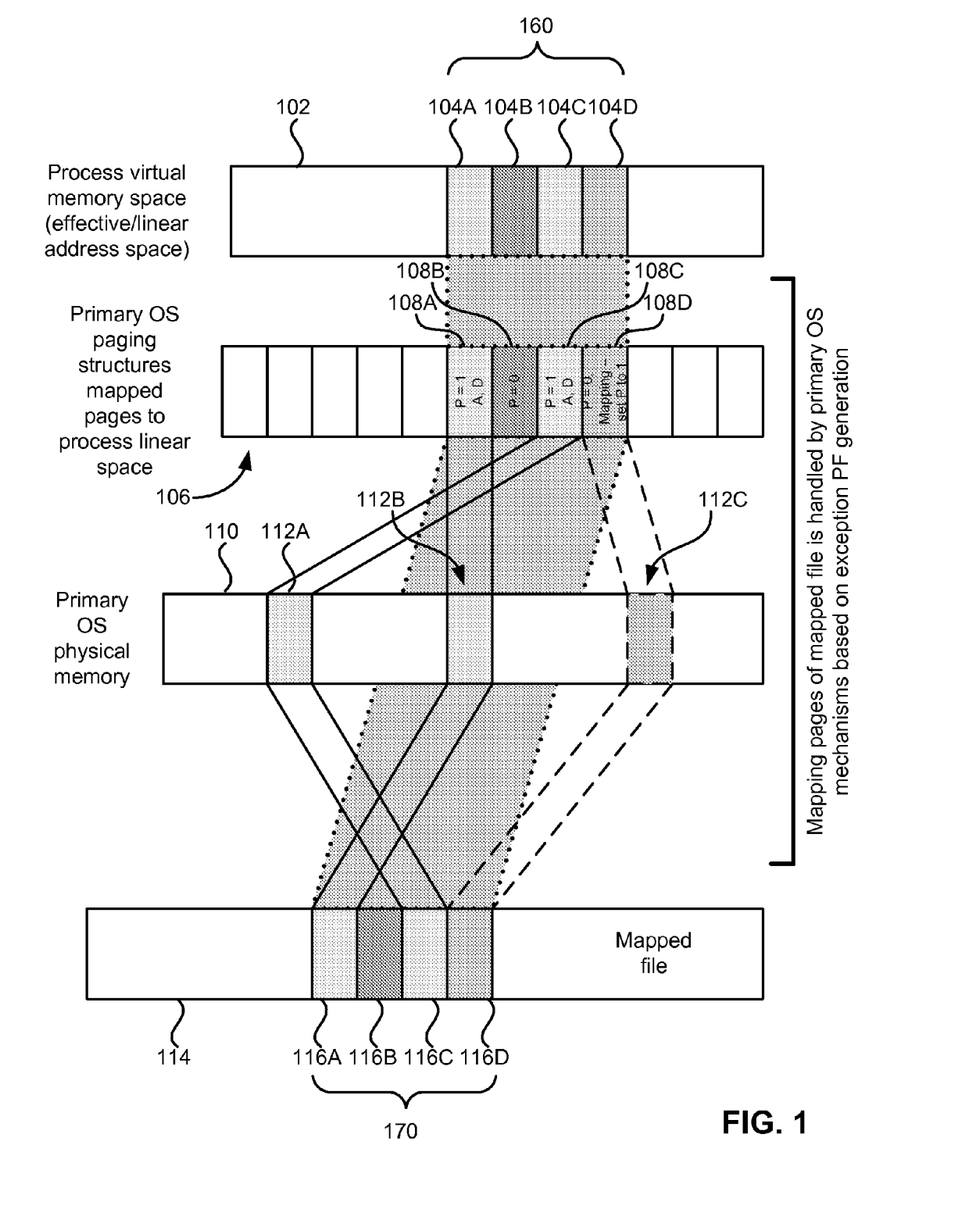
FIG. 1 illustrates a hierarchy of addressing.

Turning to FIG. 1, the hierarchy of addressing is illustrated. As shown in FIG. 1, 102 designates the process virtual memory available to the Virtual Machine. In that virtual memory 102, pages 104A-104D are used by the Virtual Machine. These pages are aggregated into a memory block 160 (generally referred to simply as "block" in subsequent discussion). The pages 104A-104D are mapped to paging structures of the process linear address space 106, through the page structure entries 108A-108D (e.g., page table entries in Intel architecture). (A general discussion of mapping may be found, for example, at http://www.multicians.org/multics-vm.html, A. Bensoussan, C. T. Clingen, The Multics Virtual Memory: Concepts and Design, Communications of the ACM, May 1972, Volume 15, Number 5, pp. 308-318), which is incorporated by reference herein in its entirety, see particularly chapter 2. These pages have attributes in corresponding page structure entries of Present or Not Present. In the case of, for instance, page 104A mapped through the PTE 108A, the present bit is set to 1, meaning, that the page is present. The process linear memory space 106 is then mapped, page-wise, to the physical memory 110 by the host, or primary, operating system. In this case, physical memory designated by 110, and the pages that are actually present designated by 112A, 112B, 112C. (In other words, some of the burden of virtualization can be placed on the host OS.)

At the bottom of FIG. 1 is a file 114, that is maintained on the disk, and by the virtualization software which represents the address space that the Virtual Machine sees—in this case, a 100 GB file. In the mapped file 114, memory pages that correspond to the physical pages 112 for this Virtual Machine are aggregated in to blocks 170, see pages 116A-116B.

Therefore, as illustrated in FIG. 1, the pages are aggregated into blocks, and virtual memory management is performed on a block-by-block basis. It should also be noted that the mapped file 114 initially is essentially empty, except for the two BIOS that the operating system needs for startup (in this case, the guest operating system running in the Virtual Machine). As the guest operating system starts running, the rest of the file 114 is filled up with code and data.

Figure 2:
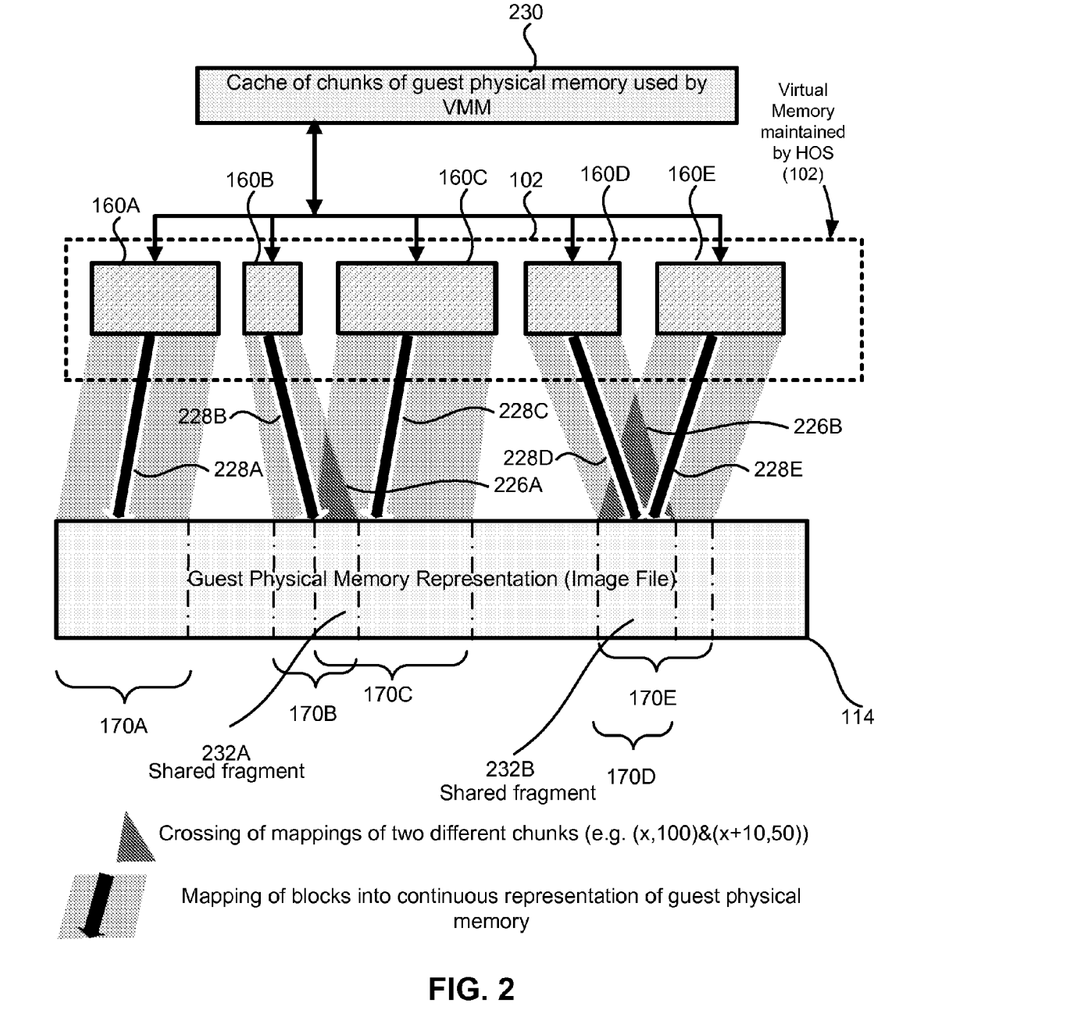
FIG. 2 illustrates how the memory blocks are organized with regard to the image file.

FIG. 2 illustrates how the memory block 160 is organized with regard to the file 114. As shown in FIG. 2, the processed virtual memory 102 that is maintained by the host operating system includes a number of memory blocks, 160A, 160B, 160C, 160D and 160E (in most practical systems, that number will be much larger than the five blocks illustrated in this figure). These blocks 160 are mapped to the image file 114, as shown in this figure. Note that the blocks need not have the same size. Generally, the size of the block (in other words, how many pages are used to form the block 160) will usually be empirically derived, and set in the CONFIG file settings of the guest OS. The block 160 should not be too small, and should not be too large in either case, the overhead will be higher than necessary, since the amount of swapping the blocks between the file 114 and the physical memory 110 will be higher than necessary. Generally, it is believed that a minimum block size of 16 pages is preferred. Also, the optimum block size is somewhat dependent on which operating system is running as the guest operating system.

As will be seen from FIG. 2, block 160A maps to block 170A in the image file 114. Block 160B maps to block 170B, etc. Note that 170B and 170C overlap resulting in a shared fragment 232A. Similarly, blocks 170D and 170E overlap, resulting in a shared fragment 232B meaning, this page, is the same, and used by both blocks 170B and 170C. The arrows 228 illustrate the mapping from the blocks 160 to the image file 114. The dark areas 226A, 226B illustrate the overlap in the mapping between two different blocks.

Figure 3:
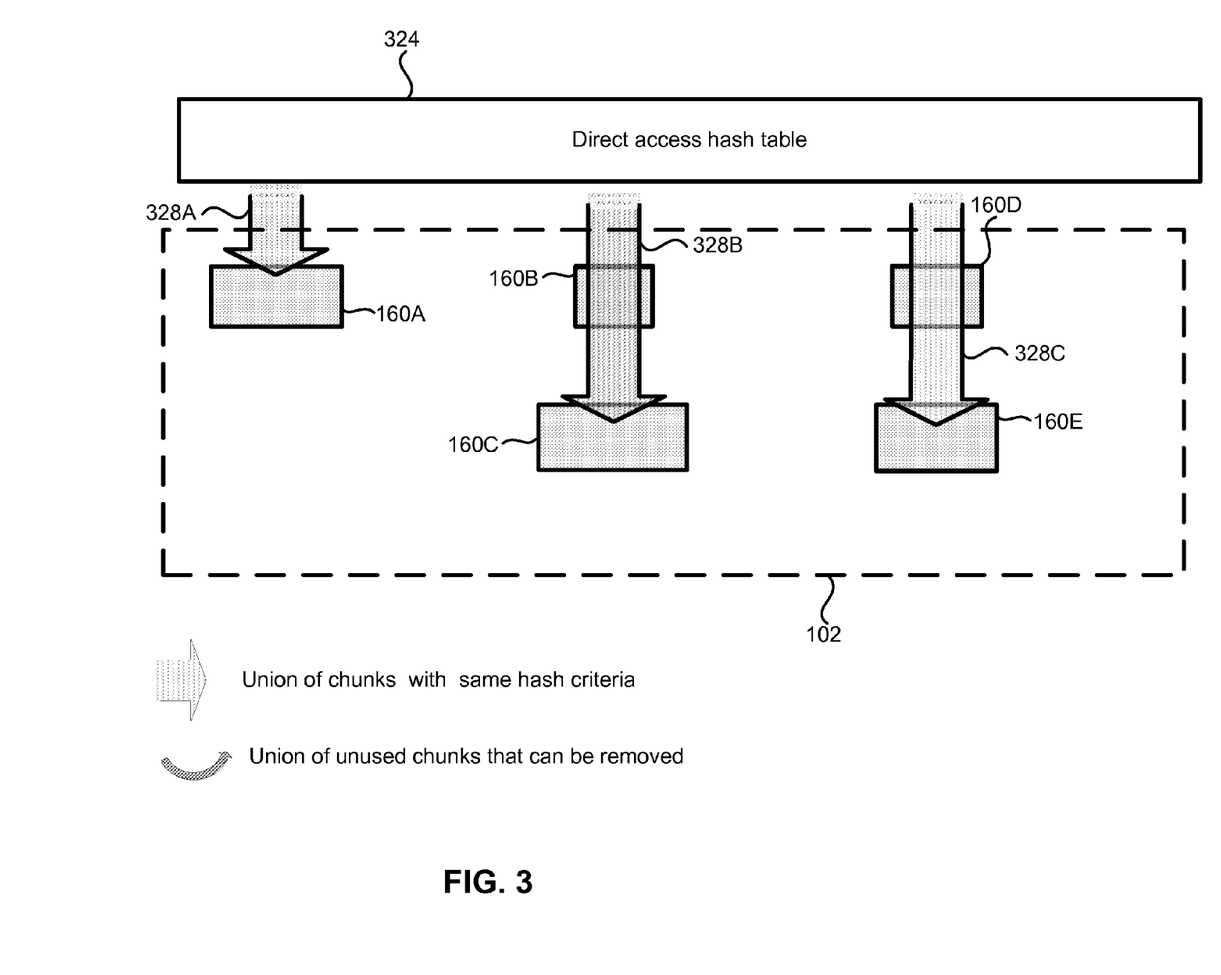
FIG. 3 illustrates one possible architecture for managing block mapping.

FIG. 3 illustrates one possible architecture for managing block mapping. As shown in FIG. 3, a table 324, such as a direct access hash table, is used to address the blocks 160. Note that the blocks 160A-160E are the same blocks as those illustrated in FIG. 2. The arrows 328A, 328B, 328C correspond to a short set of hash keys. The hash keys are generated based on a portion of the guest physical address. The hash key is then used as an index in the hash table 324, to determine the list 328. In this case, different blocks can have the same hash key. Thus, blocks 160B and 160C, which map to blocks 170B, 170C in the image file 114, have the same key, since they share the fragment 232A. Similarly, blocks 160D and 160E, which map to blocks 170D, 170E in the image file 114, also share the same hash key.

Hash table 324 is a set of pointers to short lists. A short list refers to the blocks that are already mapped to the process virtual memory. Elements of the short list are blocks 160. A criterion of the placing elements to the correspondent list is the hash key, e.g., based on block base address or/and block size. In this case, the block base corresponds to the physical memory address where the block begins.

The hash key calculation algorithm is an optional part of the invention. For example, the hash key can be the value of the base guest physical address in binary form, shifted to the right several bits, based on limitation of the hash table size.

Another example of hash key calculation can be a function based on block base guest physical address and its size. The idea of a hash table is to place mapped blocks 160 to short lists 328 and thereby to reduce enumeration complexity during searching for already mapped blocks. These short lists are linked with the direct access hash table 324. To maximize block search performance, a direct access hash table can be implemented as a "raw" array of short list pointers. To access the short list, all that is needed is to access, using an index (hash key), the corresponding array element.

Figure 4:
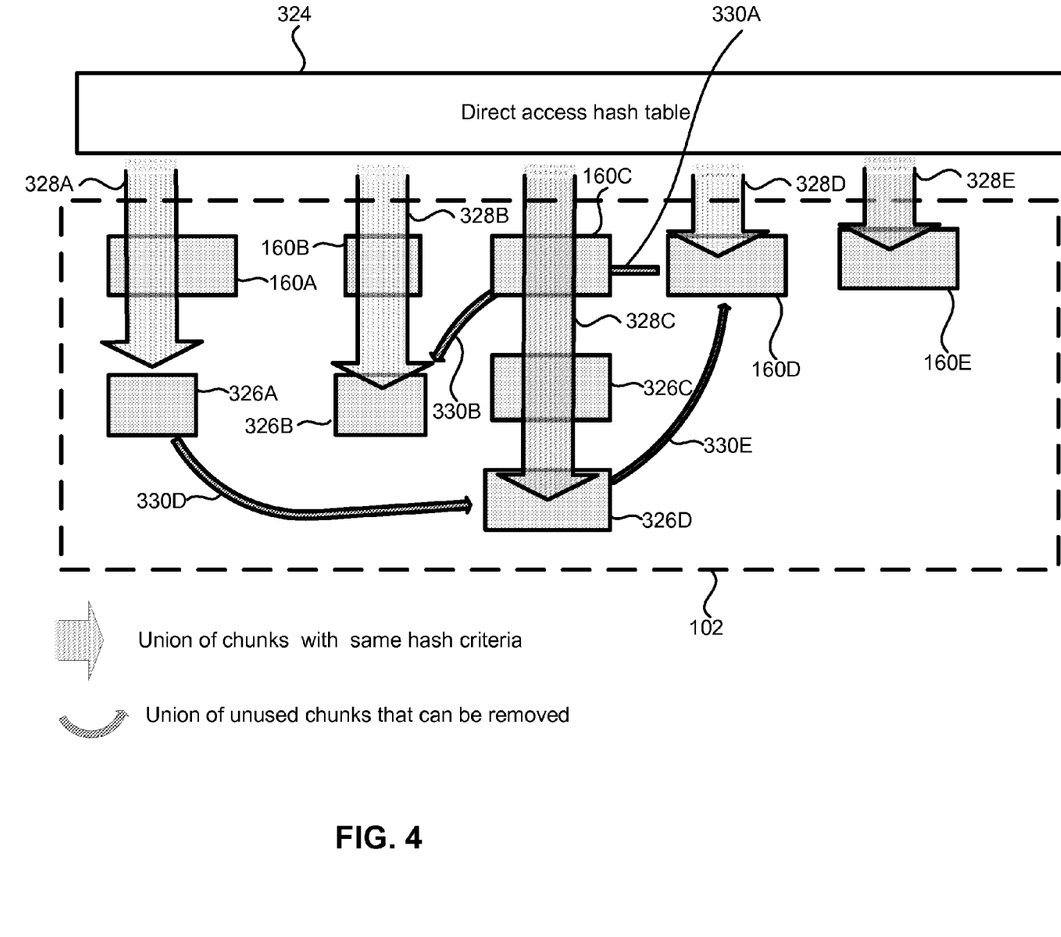
FIG. 4 illustrates an example how blocks are swapped in and out of physical memory.

FIG. 4 illustrates an example how blocks are swapped in and out of physical memory. As shown in FIG. 4, some blocks 160 have been used by the Virtual Machine recently, and others have not. For example, as one embodiment, a counter can be associated with each block 160. When the block is used in some period of time, the counter is incremented by one. If the block is not used, the counter is decremented. Also, when the counter becomes zero (block 160 becomes 326), the block is pushed out to the additional list 330 of free elements. Free blocks remain in the cache as mapped elements but which are not used currently. At some point in time, the Virtual Machine attempts to access a block that is not in the physical memory. A new block is allocated from free virtual process memory region, and is pushed to the hash table by algorithm described below. If all of the process virtual memory allotted for block allocation is already occupied by that Virtual Machine, then one of these blocks 326 needs to be swapped out to the disk (to the file 114), and the new block 160 that the Virtual Machine is trying to access needs to be brought into physical memory 110. Also other alternatives may be used for assigning lifetime for blocks. For example, a sorted or ranged list may be used where the block with the lowest range is implied as free. In this case, the range of the block may increase when block is used and may optionally fall when the block is not used for predefined time value. As an option, frequency of usage for block or blocks with lowest range may be used to choose whether the block should be considered free or the block may be released from the list to improve virtual memory performance. Other alternatives can include, for example, Least Recently Used (LRU) algorithm for selecting the block to be swapped out.

Figure 5:
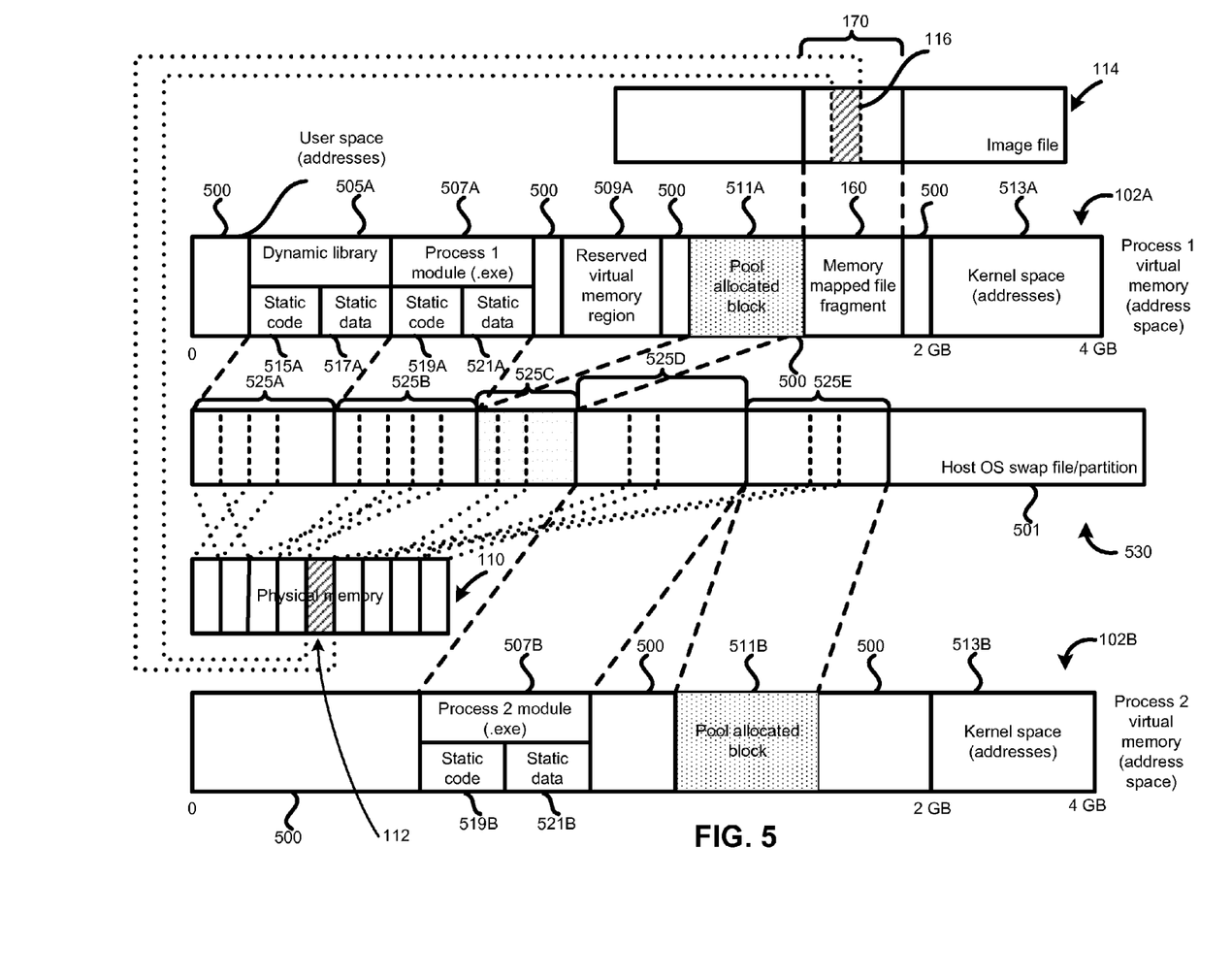
FIG. 5 is another illustration of the relationship between the various elements, as contemplated by one embodiment of the invention.

FIG. 5 is another illustration of the relationship between the various elements, as contemplated by one embodiment of the invention. Of particular note in FIG. 5 is the swap file 530, which is used by the host operating system to expand the physical memory 110, and is managed by the host operating system. Further with regard to FIG. 5, the figure shows two separate processes, process 1 and process 2, with process 1 having its virtual memory 102A and process 2 having its virtual memory 102B. (In practice, the number of processes is often much larger than two.)

In the Microsoft Windows scheme, the process virtual memory space usually has a 2 GB user address space, and a 2 GB kernel address space, for a total of 4 GB. As further shown in FIG. 5, and using process 1 virtual memory 102A as an example, the virtual memory 102A has unreserved and unused virtual address space labeled by 500. Initially, almost the entire address space 102A might be empty. 505A is a dynamic library, which typically includes static code 515A and static data 517A. A process module 507A includes static code 519A and static data 521A. In MS Windows, these are usually .exe files that are loaded and installed in memory. The process 1 virtual memory 102A can also include reserved regions 509A, pool allocated regions 511A (e.g., by using user space API function VirtualAlloc in MS Windows), and a memory mapped file fragment 160—the same block 160 discussed earlier with regard to the prior figures. The kernel address space 513 is, as discussed earlier, 2 GB in the MS Windows implementation, although the invention is not limited to MS Windows, and, therefore, can be larger or smaller, depending on the particular OS.

The various portions of the process 1 virtual memory 102A thus map to the swap file 530 (see regions 525A, 525B, 525C). Similarly, the regions 507B, 511B of process 2 virtual memory 102B map to regions 525D, 525E of the swapped file 530. Note that the reserved virtual memory 509A does not map to any region in the swap file 530. The pages within the swap file 530 are swapped in and out of the physical memory 110 by the host operating system, as discussed earlier. Also, the block 160 of the virtual memory 102A maps to block 170 of the image file 114 that represent the guest operating system virtual address space. Page 116 in the image file 114 maps to the page 112 in the physical memory 110.

It should be further noted that the mechanism used to swap pages of the image file 114 to and from the physical memory 110 can be generally similar to the mechanism used by the host operating system to swap pages between the swap file 530 and the physical memory 110, the difference being that the management of the mapping between the file 114 and the physical memory is done by the virtualization software, while the HOS understands that page swapping from this region is redirected to the image file against of usual swap file. Furthermore, in FIG. 5, each process has a kernel space 513. In practice, many of the pages of the kernel space 513 can be shared between processes, since mostly they contain common data and code such as drivers, libraries, etc. Therefore, a file such as an image file 114 can also be used with kernel spaces of various processes, where there is commonality of the contents. Note also that the memory mapped file segment (block) 160 in the virtual memory address space 102B maps to the image file 114, but does not map to the swap file 530 maintained by the host operating system. This is one of the reasons why the limitation on the size of the memory allocated to each guest operating system can be avoided.

In the particular example based on separate (independent) spaces (contexts) of the VMM and the Primary OS, the VMM can only access the guest physical memory blocks 160 described earlier by using real physical addresses of their physical pages. Therefore, the corresponding memory blocks 160 have to be locked (or "wired," using the terminology of some operating systems) to real physical pages. The VMM maps such pages in its address space, and the guest operating systems access their guest physical pages through the VMM mapping.

The present invention is not limited to using a single swap file for guest physical memory representation and one process that maps its fragments (blocks) to the memory. To increase the virtual memory limit available to one process, several processes can be used to map blocks. In this case, virtualization software can simultaneously map blocks in several processes and therefore virtualization software can use combined virtual memory limit to map blocks of a single VM's physical memory, which gives a single VM more memory than a single process would have otherwise. As yet another option, each VM can use a smaller memory size than physical memory, but the sum of all physical memory sizes of the running VMs is more than the real physical memory.

Figure 6:
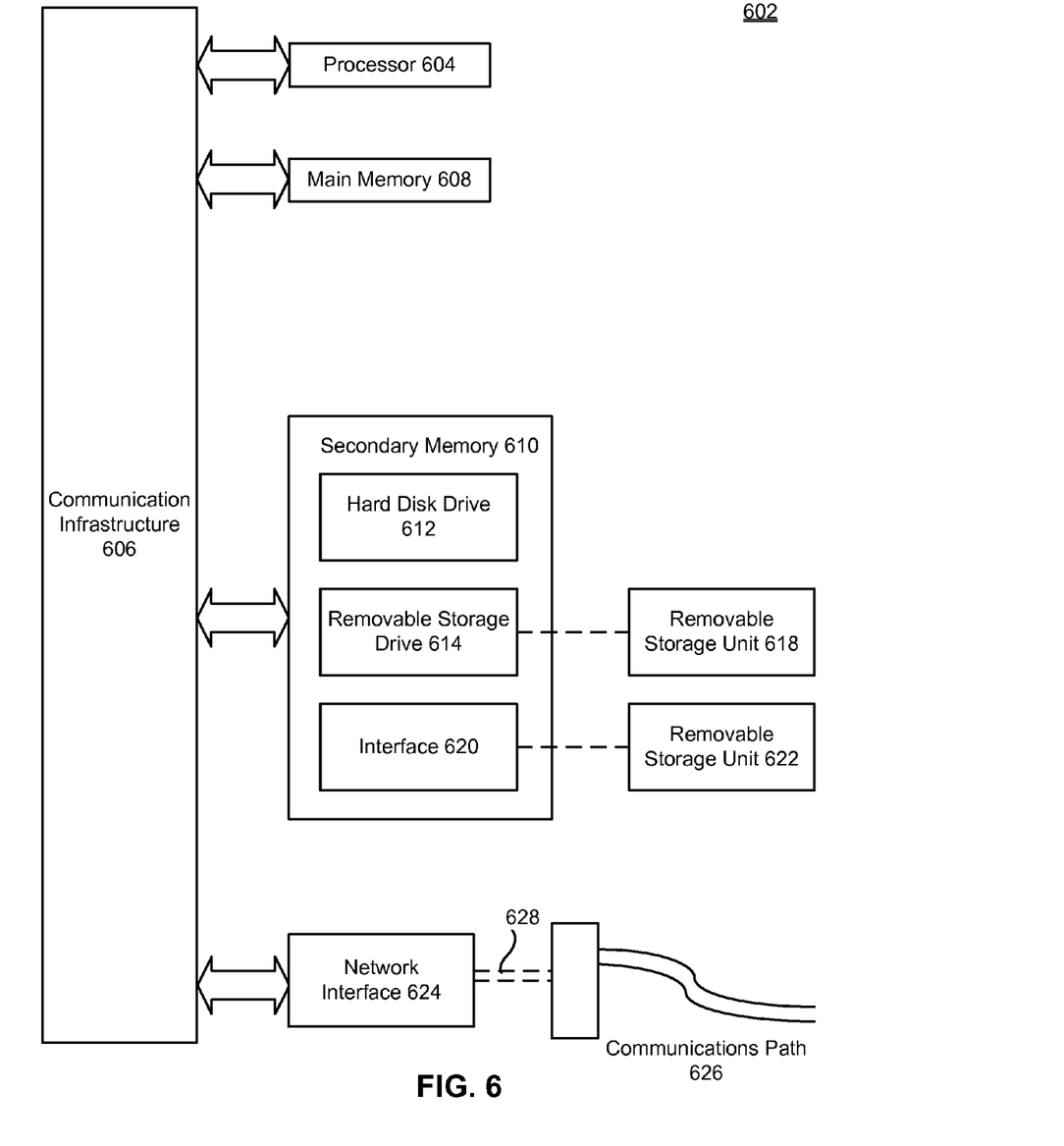
FIG. 6 illustrates an example of a computer system where the neural network can be implemented.

An example of the computer 602 on which the neural network can be implemented is illustrated in FIG. 6. The computer 602 includes one or more processors, such as processor 601. The processor 601 is connected to a communication infrastructure 606, such as a bus or network). Various software implementations are described in terms of this exemplary computer system. After reading this description, it will become apparent to a person skilled in the relevant art how to implement the invention using other computer systems and/or computer architectures.

Computer 602 also includes a main memory 608, preferably random access memory (RAM), and may also include a secondary memory 610. The secondary memory 610 may include, for example, a hard disk drive 612 and/or a removable storage drive 614, representing a magnetic tape drive, an optical disk drive, etc. The removable storage drive 614 reads from and/or writes to a removable storage unit 618 in a well known manner. Removable storage unit 618 represents a magnetic tape, optical disk, or other storage medium that is read by and written to by removable storage drive 614. As will be appreciated, the removable storage unit 618 can include a computer usable storage medium having stored therein computer software and/or data.

In alternative implementations, secondary memory 610 may include other means for allowing computer programs or other instructions to be loaded into computer 602. Such means may include, for example, a removable storage unit 622 and an interface 620. An example of such means may include a removable memory chip (such as an EPROM, or PROM) and associated socket, or other removable storage units 622 and interfaces 620 which allow software and data to be transferred from the removable storage unit 622 to computer 602.

Computer 602 may also include one or more communications interfaces, such as communications interface 624. Communications interface 624 allows software and data to be transferred between computer 602 and external devices. Examples of communications interface 624 may include a modem, a network interface (such as an Ethernet card), a communications port, a PCMCIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path (i.e., channel) 626. This channel 626 carries signals 628 and may be implemented using wire or cable, fiber optics, an RF link and other communications channels. In an embodiment of the invention, signals 628 comprise data packets sent to processor 601. Information representing processed packets can also be sent in the form of signals 628 from processor 601 through communications path 626.

The terms "computer program medium" and "computer usable medium" are used to generally refer to media such as removable storage units 618 and 622, a hard disk installed in hard disk drive 612, and signals 628, which provide software to the computer 602.

Computer programs are stored in main memory 608 and/or secondary memory 610. Computer programs may also be received via communications interface 624. Such computer programs, when executed, enable the computer 602 to implement the present invention as discussed herein. In particular, the computer programs, when executed, enable the processor 601 to implement the present invention. Where the invention is implemented using software, the software may be stored in a computer program product and loaded into computer 602 using removable storage drive 614, hard drive 612 or communications interface 624.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A virtualization system comprising:
   a host operating system (OS);
   virtualization software that maintains a virtualization environment for running a Virtual Machine (VM) without system level privileges;
   a plurality of processes running within the host OS, each process having its own virtual memory, wherein the virtualization software is one of the processes;
   at least one image file stored in persistent storage and maintained by the host OS, wherein the image file represents virtualized physical memory of the VM; and
   a plurality of memory pages of the VM aggregated into blocks, the blocks being stored in the image file and addressable in block form,
   wherein the virtualization software manages the blocks so that blocks can be mapped to the virtualization software process virtual memory and released when the blocks are no longer necessary, wherein the host OS swaps the blocks between the image file and physical memory using memory mapped file mechanism of the host OS, when a block that is not in physical memory is accessed by the VM, wherein the VM physical memory size corresponds to image file size and is not subject to limitation on virtual process memory size set by the host OS.

2. The system of claim 1, wherein the virtualization software comprises:

a Virtual Machine Monitor (VMM) that manages VM's behavior and has system level privileges; and a host OS driver for interfacing to underlying hardware.

3. The system of claim 2, wherein the VMM maps, in the VMM and VM address spaces, pages of virtualized physical memory by using real physical pages; and wherein corresponding blocks are locked in the physical memory.

4. The system of claim 1, wherein a counter is associated with each block, such that when the block is accessed, the counter is incremented, when the block is not accessed in the predetermined period of time, the counter is decremented, and when the counter becomes a predetermined value, the block is designated as a free block.

5. The system of claim 4, wherein the free block remains as a mapped element, but the free block not used by the Virtual Machine.

6. The system of claim 5, wherein, when Virtual Machine attempts to access a block that is not in the virtual process memory, a new block is allocated from free virtual process memory region, and is pushed to the hash table.

7. The system of claim 6, wherein, if all of the virtual memory allocated to the Virtual Machine has been used up, then the free block is swapped out to the image file.

8. The system of claim 7, wherein a new block that the Virtual Machine is trying to access is brought into the physical memory.

9. The system of claim 1, wherein a block comprises multiple memory pages.

10. The system of claim 1, wherein different blocks share at least one guest physical page.

11. The system of claim 1, wherein the blocks are of different size.

12. The system of claim 1, further comprising a direct access hash table for addressing blocks.

13. The system of claim 12, wherein the direct access hash table includes a plurality of hash keys, each hash key based on a portion of a guest physical address of its corresponding block.

14. The system of claim 13, wherein overlapping blocks have the same hash key.

15. A method for managing memory in a virtualization system comprising:

initiating a host operating system (OS);

starting virtualization software that maintains a virtualization environment for running a Virtual Machine (VM) without system level privileges and having a guest operating system running within the Virtual Machine;

starting a plurality of processes running within the host OS, each process having its own virtual memory, wherein the virtualization software is at least one of the processes;

allocating at least one image file in persistent storage, the image file maintained by the host OS and representing virtualized physical memory of the VM; and aggregating a plurality of memory pages into blocks, the blocks being stored in the image file and addressable in block form, wherein the virtualization software manages the blocks so that blocks can be mapped to the virtualization software process virtual memory and released when the blocks are no longer necessary, wherein the host OS swaps the blocks between the image file and physical memory when a block that is not in physical memory is accessed by the VM, wherein the image file size is not subject to limitation on virtual process memory size, and wherein a user of the VM can access a larger virtual process memory than the host OS permits.

16. The method of claim 15, wherein the VMM maps, in the VMM and VM address spaces, pages of virtualized physical memory by using real physical pages; and wherein corresponding blocks are locked in the physical memory.

17. The method of claim 15, wherein a counter is associated with each block, such that when the block is accessed, the counter is incremented, when the block is not accessed in the predetermined period of time, the counter is decremented, and when the counter becomes a predetermined value, the block is designated as a free block.

18. The method of claim 17, wherein the free block remains as a mapped element, but the free block not used by the Virtual Machine.

19. The method of claim 18, wherein, when Virtual Machine attempts to access a block that is not in the virtual process memory, a new block is allocated from free virtual process memory region, and is pushed to the hash table.

20. The method of claim 19, wherein, if all of the virtual memory allocated to the Virtual Machine has been used up, then the free block is swapped out to the image file.

21. The method of claim 15, wherein different blocks share at least one guest physical page.

22. The method of claim 15, further comprising a direct access hash table for addressing blocks.

23. The method of claim 22, wherein the direct access hash table includes a plurality of hash keys, each hash key based on a portion of a guest physical address of its corresponding block.

24. The method of claim 23, wherein overlapping blocks have the same hash key.

25. A computer useable software medium having computer program logic stored thereon for executing on a processor for managing a process virtual memory, the computer program logic comprising:

computer program code means for initiating a host operating system (OS);

computer program code means for starting virtualization software that maintains a virtualization environment for running a Virtual Machine (VM) without system level privileges and having a guest operating system running within the Virtual Machine;

computer program code means for starting a plurality of processes running within the host OS, each process having its own virtual memory, wherein the virtualization software is at least one of the processes;

computer program code means for allocating at least one image file in persistent storage, the image file maintained by the host OS and representing virtualized physical memory of the VM; and computer program code means for aggregating a plurality of memory pages into blocks, the blocks being stored in the image file and addressable in block form, wherein the virtualization software manages the blocks so that blocks can be mapped to the virtualization software process virtual memory and released when the blocks are no longer necessary, wherein the host OS swaps the blocks between the image file and physical memory when a block that is not in physical memory is accessed by the VM, wherein the image file size is not subject to limitation on virtual process memory size, and wherein a user of the VM can access a larger virtual process memory than the host OS permits.

* * * * *